Jan. 17, 1928.

J. HARRIS 1,656,375

VALVE FOR TANKS

Filed Dec. 19, 1923

Inventor
John Harris,
By Hull, Brock & West
Attys.

Patented Jan. 17, 1928.

1,656,375

UNITED STATES PATENT OFFICE.

JOHN HARRIS, OF CLEVELAND, OHIO, ASSIGNOR TO THE HARRIS CALORIFIC COMPANY, OF CLEVELAND, OHIO, A CORPORATION OF OHIO.

VALVE FOR TANKS.

Application filed December 19, 1923. Serial No. 681,499.

This invention relates to valves for tanks containing gases under pressure, and particularly to valves of the type wherein a diaphragm operates to control, or to assist in controlling, the flow of gas from a tank to the point of use. It is the general purpose and object of the invention to provide a valve of this character which will not leak, notwithstanding its use for handling gases under the pressures which obtain in such tanks; to provide a valve of this character wherein the diaphragm will not burst nor rupture by reason of the pressure of the gases to which it is subjected; also to provide a valve of this character which can be firmly seated without injury to the diaphragm, and one which is not liable to injury by reason of the unauthorized or unintelligent operation of the same.

A further object of the invention is to provide a valve of this character which is not only more efficient in operation and in service than valves heretofore used for its purpose, but one which can be produced at a minimum of expense.

Figure 1:
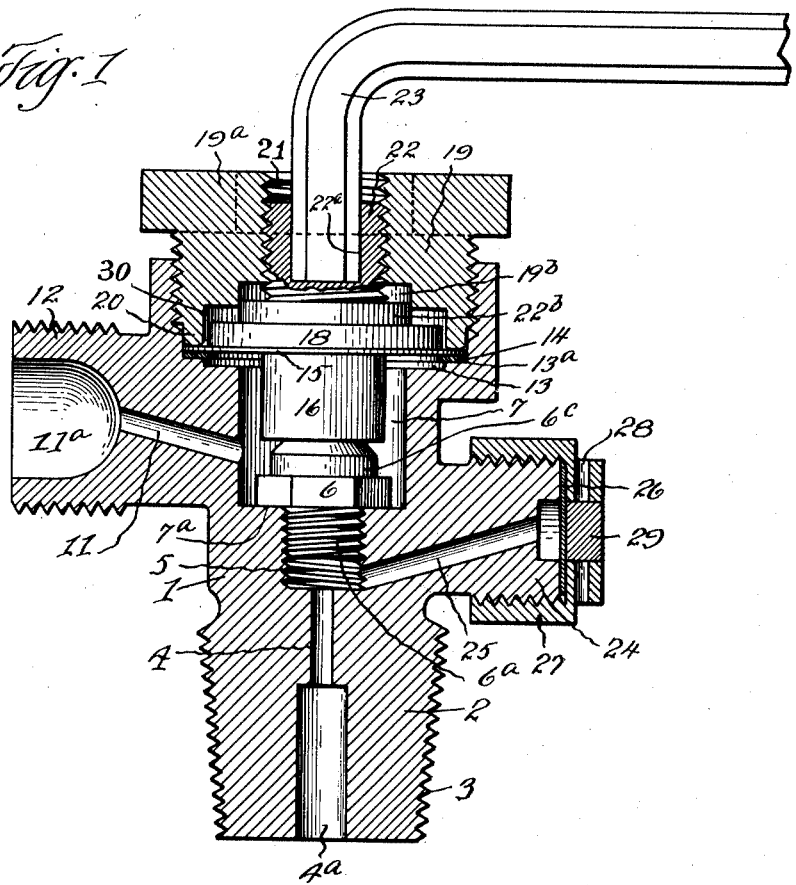
Figure 2:
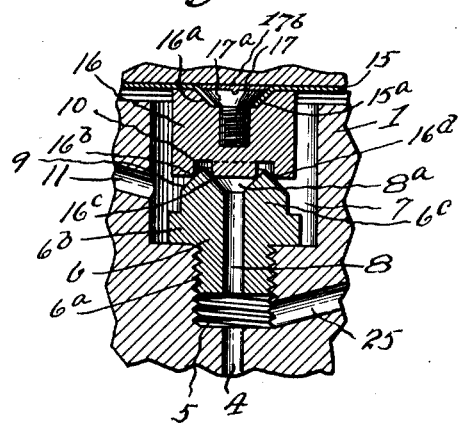
Figure 3:
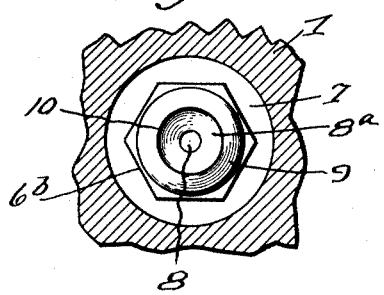

I accomplish the foregoing objects and other objects which will appear hereinafter in and through the combinations and arrangements of parts described in the specification and embodied in the claims, the invention being illustrated in the drawings forming part hereof, wherein Fig. 1 represents a central vertical sectional view through the valve, certain parts being shown in elevation; Fig. 2 a sectional detail of the valve block proper and its seat, with the associated parts; and Fig. 3 a detail in plan of the valve seat and the surrounding chamber, the portion of the valve body surrounding the chamber being shown in section.

Describing the various parts by reference characters, 1 represents generally the body of the valve, the same being of any suitable metal and having a slightly tapered lower end 2 provided with a thread 3 by which the valve body may be secured in the top of the tank with which it cooperates, the tank being of any standard construction such as is used for containing and shipping gases under pressure—for instance, oxygen and cutting and welding gases.

The valve body is provided with a central bore 4 which is enlarged at its lower end, as indicated at 4ª. The upper end of the bore communicates with a chamber 5 beneath the valve seat plug 6, the said chamber being formed at the bottom of a threaded bore into which the threaded reduced end 6ª of the valve seat is screwed. The upper end of the valve seat plug 6 is located within a chamber 7. The plug is provided with a hexagonal projection 6ᵇ which is adapted to receive a socket wrench and the lower face of which seats upon the bottom wall 7ª of the chamber 7. Above the hexagonal projection 6ᵇ, the valve seat plug has a cylindrical portion 6ᶜ. The plug is provided with a central bore 8, preferably of the same cross-sectional area as the bore 4 communicating at its lower end with the chamber 5 and constituting with the bore 4 and chamber 5 a passage for the supply of gas to the chamber 7. The upper end of the bore 8 merges with an inverted frusto-conical cup 8ª, formed in the top of the valve seat plug. The upper outer part of the plug is tapered or frusto-conical in shape, above the cylindrical part 6ᶜ, as indicated at 9, the tapered seating surfaces 8ª and 9 meeting in a common circular line or edge 10. It will be evident that the upper end of the valve seat plug 6 is triangular in vertical section.

An upwardly inclined passage 11 leads from one side of the chamber 7 and discharges into a chamber 11ª in the threaded portion of a connection 12, the said connection being adapted to receive a suitable regulator for delivering the gas passing through the valve to the point of use—for instance, the valve block of a blow-pipe.

It will be noted that the chamber 7 is sufficiently larger in cross-sectional area than the valve-seat plug to receive the lower end of a socket wrench, thereby enabling the plug to be conveniently applied to and removed from the assembly.

The upper end of the chamber 7 communicates with an enlarged cylindrical extension 13, the upper end of the extension chamber being surrounded by a horizontal annular ledge or shoulder 13ª, the said ledge or shoulder constituting a seat for gasket 14. This gasket, as at present constructed, is made of a special paper impregnated with gylcerine, whereby a leak-proof peripheral seat is provided for the diaphragm 15, which seat will remain leak-proof under high pressure—in excess of 5,000 pounds per square inch. The peripheral portion of the diaphragm is seated upon the gasket 13ª and is adapted to be locked in place by means of a plug, to be described hereinafter. The central portion 15ª of the diaphragm is fitted into an inverted frusto-conical seat 16ª provided in the center of the valve block 16. This valve block is shown as cylindrical in shape and projects downwardly within the chamber 7, there being a wide annular space between the block and the wall of the chamber to permit the gas within such chamber to operate efficiently upon the diaphragm. The diaphragm is secured to the central portion of the valve block by means of a screw 17, the head 17ª of said screw conforming generally to the frusto-conical shape of the central portion 15ª of the diaphragm and its cooperating depending seat. The top of the screw and the portion of the diaphragm surrounding the central depressed portion 15ª are anchored together by means of solder, indicated at 17ᵇ, covering the head of the screw and fitting within the depression formed in the diaphragm by the portion 15ª. This construction provides a strong and non-leaking connection between the valve and the diaphragm.

Resting on top of the diaphragm is a disk 18, constituting a rigid backing for the diaphragm and preventing rupture of the same by strong pressure in the chamber 7 therebeneath. It will be noted that the backing extends nearly to the periphery clamped portion of the diaphragm, whereby practically the entire top of the diaphragm is reinforced, by the backing, against upwardly-exerted pressure, but without detriment to the action of the diaphragm.

The diaphragm is secured in place by means of a plug 19 threaded into the top of the body 1 and having a depending annular skirt 20 which is adapted to engage the upper periphery of the diaphragm and force the same against the gasket 14 on the annular shoulder or seat 13ª. This plug may be squared at its upper end, as indicated at 19ª, for the reception of a wrench, and it is provided with a central threaded bore 21 for the reception of a locking plug 22. This plug is of such length that, when screwed home against the disk 18, it will hold the lower end of the valve 16 against its double seat, with the diaphragm 15 horizontal and the top of the locking plug below the top of the plug 19. In order to operate the locking plug 22, I provide the same with a socket 22ª which is adapted to receive a small angular socket wrench 23, by means of which the valve 16 may be forced to its double seat or the locking plug may be unscrewed a sufficient distance to permit the valve and diaphragm to operate by the pressure of the gas flowing through the ports 4ª and 4. The plug 22 is retained in place, when the complete valve is assembled, by means of a flanged head 22ᵇ on the lower end thereof, which flanged head is adapted to enter a recess 19ᵇ provided therefor in the bottom of the plug 19, above the disk 18.

Reference has been made to the double seat provided for the valve block 16. This double seat is provided by means of an annular groove 16ᵇ, formed in the lower end of the valve block proper, this groove providing a circular inner seating portion 16ᶜ and a circular outer seating portion 16ᵈ adapted respectively to engage the reversely inclined seating surfaces 8ª and 9 of the valve seat plug therebeneath. This construction prevents any leakage between the valve seat plug and the cooperating valve block 16, while the manner of securing the diaphragm in place prevents any leakage around the peripheral portion of the latter.

One of the tank valves which is in extensive use employs the diaphragm itself for the valve, the diaphragm directly engaging the valve seat. This is objectionable in that the diaphragm, after a short time, fails to make a gas-tight closure with the seat, with the result that leakage occurs, this leakage amounting, in the types of tank valves in general use, to a very considerable proportion of the contents of the tank.

The valve body 1 is provided with the usual blow-off connection 24 having the outlet port 25 communicating with the chamber 5, the outer end of the connection being shown as closed by a diaphragm 26 and a screw cap 27 having laterally directed discharge apertures 28 closed by a fusible plug 29.

In the construction disclosed herein, I employ a separate valve block, attaching the same to the diaphragm. Because of the double-seating arrangement provided by the valve body and the valve seat plug, I am enabled to obtain and retain a gas-tight closure and to accomplish this result without resorting to special and expensive metals for these parts; for the valve body 16, I can employ brass, and for the seat plug 6, I can use ordinary phosphor bronze.

For the backing disk 18, I may use copper or any other relatively soft metal; and the disk, while enabling me to use a diaphragm of large area (which will be readily responsive to variations in pressure) will prevent such diaphragm from bursting.

One of the most fruitful sources of injury to the diaphragms and valve seats of tank valves is by the application of powerful wrenches to the plugs by which the valves are seated while the tanks are not in use, as during shipment. The form of plug provided herein makes it impossible to operate the valve by any ordinary tool or wrench; and the special tool or wrench which is furnished as part of my valve equipment is so short as to prevent the application of considerable power to the plug by the operator authorized to use the same. The fact that no great power is needed to seat the valve sufficiently tight to prevent leakage and that the means provided for seating the valve will not permit the use of excessive force or power enables my valve to remain in use for a long period of time without leakage or injury to the parts thereof. The manner of fitting the locking plug 22 in the threaded bore provided therefor in the plug 19 makes it impossible for the former plug to be unscrewed from the latter and to be lost in shipment.

It will be observed that a shallow chamber 30 is provided above the top of the disk 18, the top of which chamber is adapted to form a stop for limiting the upward deflection of the diaphragm and its backing disk.

For convenience of description the valve will be assumed as used in the position indicated in the drawing—with the part 3 at the bottom and the plug 19 at the top; and the terms "upwardly", "downwardly", "above", "below", "top" and "bottom" will be used to indicate the relative positions of the parts, but without limiting the use of the invention to any particular position of the valve or of the tank to which it is applied.

This case is in some respects a continuation of my application No. 647,245 filed June 23, 1923.

Having thus described my invention, what I claim is:—

1. In a valve of the character described, the combination of a body having a passage for the supply of fluid, there being a valve seat at the delivery end of said passage, with a diaphragm chamber surrounding and extending beyond the said seat and a delivery port leading from the said chamber, a diaphragm secured at its peripheral portion and extending across the diaphragm chamber, said diaphragm being adapted to be exposed directly to the pressure of fluid emitting from said passage, a valve secured to the central portion of the said diaphragm and adapted to engage the said valve seat, a backing on the opposite surface of the diaphragm from the said valve, a plug for securing the diaphragm to its seat, and a socketed plug threaded within the first mentioned plug and adapted to engage the diaphragm backing, the said socketed plug projecting through the first mentioned plug and being provided with a peripheral projection at its lower end adapted to engage the first mentioned plug to prevent its withdrawal in one direction from such first mentioned plug.

2. In a valve of the character described, the combination of a body having a passage for the supply of fluid, there being a valve seat at the delivery end of said passage, with a diaphragm chamber surrounding and extending beyond the said seat and a delivery port leading from the said chamber, a diaphragm secured at its peripheral portion and extending across the diaphragm chamber, said diaphragm being adapted to be exposed directly to the pressure of fluid emitting from said passage, a valve secured to the central portion of the said diaphragm and adapted to engage the said valve seat, a backing on the opposite surface of the diaphragm from the said valve, a plug for securing the diaphragm to its seat, and a socketed plug threaded within the first-mentioned plug and adapted to engage the diaphragm backing, the said socketed plug projecting through the first mentioned plug and being provided with a peripheral flange at its lower end adapted to seat within a recess in the bottom of the first mentioned plug to prevent its removal upwardly from such first mentioned plug.

3. In a valve of the character described, the combination of a body having a passage for the supply of fluid, there being a valve seat at the delivery end of said passage, with a diaphragm chamber surrounding and extending beyond the said seat and a delivery port leading from the said chamber, a diaphragm secured at its peripheral portion and extending across said chamber, a valve adapted to engage the said valve seat, the said valve having a central tapered recess, the said diaphragm having a centrally tapered portion adapted to engage the tapered wall of said recess, and securing means having a tapered wall adapted to engage the tapered portion of the diaphragm and clamp the same against the tapered valve wall.

4. In a valve of the character described, the combination of a body having a passage for the supply of fluid, there being a valve seat at the delivery end of said passage, with a diaphragm chamber surrounding and extending beyond the said seat and a delivery port leading from the said chamber, a diaphragm secured at its peripheral portion and extending across said chamber and having a central depressed portion, a valve block having a central depressed portion, and means for securing the central depressed portion of the diaphragm within such depressed portion of said valve block.

5. In a valve of the character described, the combination of a body having a passage for the supply of fluid, there being a valve seat at the delivery end of said passage, the said seat comprising an inner outwardly inclined seating surface and an outer inwardly inclined seating surface, there being a diaphragm chamber surrounding and extending beyond the said seat with a delivery port leading from the said chamber, a diaphragm secured to and within said chamber, said diaphragm being adapted to be exposed directly to the pressure of fluid emitting from said passage, and a valve secured to the central portion of the diaphragm and having inner and outer circular seat-engaging portions cooperating respectively with the inner and outer seating surfaces of the valve seat.

6. In a valve of the character described, the combination of a body having a bore extending upwardly from the bottom thereof for the supply of fluid and a valve seat having a bore forming a continuation of the first mentioned bore, the said valve seat having an inner upwardly inclined seating surface at the delivery end of its bore and an outer inclined seating surface surrounding the first mentioned seating surface, there being a chamber surrounding and extending beyond the valve seat, with a delivery port communicating with said chamber, a diaphragm secured to and within said chamber, said diaphragm being adapted to be exposed directly to the pressure of fluid emitting from said bores, and a valve secured to the central portion of said diaphragm and having an annular recess providing circular inner and outer seat-engaging portions adapted to cooperate with the inner and outer seating-surfaces respectively.

In testimony whereof, I hereunto affix my signature.

JOHN HARRIS.